(12) United States Patent
Chen et al.

(10) Patent No.: US 9,321,951 B2
(45) Date of Patent: Apr. 26, 2016

(54) HYDROGEN BONDING MATERIAL FOR OILFIELD APPLICATION

(75) Inventors: Yiyan Chen, Sugar Land, TX (US); Michaela Nagl, Cambridge (GB)

(73) Assignee: SCHLUMBERGER TECHNOLOGY CORPORATION, Sugarland, TX (US)

( * ) Notice: Subject to any disclaimer, the term of this patent is extended or adjusted under 35 U.S.C. 154(b) by 0 days.

(21) Appl. No.: 13/517,304

(22) PCT Filed: Dec. 16, 2010

(86) PCT No.: PCT/US2010/060672
§ 371 (c)(1),
(2), (4) Date: Jan. 23, 2013

(87) PCT Pub. No.: WO2011/079008
PCT Pub. Date: Jun. 30, 2011

(65) Prior Publication Data
US 2013/0130950 A1    May 23, 2013

Related U.S. Application Data

(60) Provisional application No. 61/288,655, filed on Dec. 21, 2009.

(51) Int. Cl.
| | | |
|---|---|---|
| *C09K 8/62* | (2006.01) | |
| *C09K 8/00* | (2006.01) | |
| *C09K 8/512* | (2006.01) | |
| *C09K 8/68* | (2006.01) | |

(52) U.S. Cl.
CPC . *C09K 8/00* (2013.01); *C09K 8/512* (2013.01); *C09K 8/685* (2013.01)

(58) Field of Classification Search
CPC ......... E21B 43/26; E21B 47/06; E21B 33/13; E21B 43/267; E21B 33/124; E21B 34/06; E21B 34/16; E21B 47/00; E21B 4/02; E21B 17/01; E21B 2034/002; E21B 36/00; E21B 47/065; E21B 47/12; E21B 10/567; E21B 41/0085; E21B 41/0092; E21B 43/122; E21B 43/14; E21B 43/16; E21B 43/2408; E21B 43/38; E21B 43/40; E21B 47/091; E21B 47/124; E21B 47/14; E21B 49/008; E21B 7/00; E21B 7/04; E21B 10/003; C09K 8/62

See application file for complete search history.

(56) References Cited

U.S. PATENT DOCUMENTS

| | | | | |
|---|---|---|---|---|
| 5,939,485 | A | * 8/1999 | Bromberg | A41C 3/10 524/556 |
| 6,683,151 | B1 | * 1/2004 | Loontjens | C08G 18/3851 106/18.32 |
| 7,250,487 | B2 | 7/2007 | Tournilhac et al. | |
| 7,348,397 | B2 | * 3/2008 | Tournilhac | C08F 8/30 525/178 |
| 7,398,826 | B2 | * 7/2008 | Hoefer | C09K 8/12 166/280.1 |
| 2005/0148760 | A1 | 7/2005 | Tournilhac et al. | |
| 2006/0157248 | A1 | 7/2006 | Hoefer et al. | |
| 2009/0062551 | A1 | * 3/2009 | Tournilhac | C08F 8/30 548/313.7 |

FOREIGN PATENT DOCUMENTS

| | | |
|---|---|---|
| WO | 2006087475 A1 | 8/2006 |
| WO | 2008029065 A2 | 3/2008 |

OTHER PUBLICATIONS

Cordier, et al., "Self-healing and thermoreversible rubber from supramolecular assembly", Nature, vol. 451, Feb. 21, 2008, pp. 977-980.

* cited by examiner

*Primary Examiner* — Susannah Chung
*Assistant Examiner* — Kumar R Bhushan
(74) *Attorney, Agent, or Firm* — Jeffrey R. Anderson; Rachel E. Greene; Tim Curington

(57) ABSTRACT

Methods of treating a well, by providing a supramolecular polymer fluid comprising units connected via reversible hydrogen bonds to form a supramolecular polymer; by introducing the supramolecular polymer fluid in the well; and by treating the well with the supramolecular polymer fluid.

18 Claims, 4 Drawing Sheets

HYDROGEN BONDING MATERIAL FOR OILFIELD APPLICATION

CROSS-REFERENCE TO RELATED APPLICATIONS

This application claims benefit and priority as a PCT national phase application of PCT International Patent Application PCT/US2010/060672, filed on Dec. 16, 2010, which claims benefit and priority to U.S. Provisional Patent Application No. 61/288,655, filed Dec. 21, 2009, both of these applications are hereby incorporated by reference in their entirety.

FIELD OF THE INVENTION

This invention relates generally to composition and method for treating a well penetrating a subterranean formation. More specifically, the invention relates to hydrogen bonding material treatment fluids and associated methods of use in oilfield application.

BACKGROUND ART

Some statements may merely provide background information related to the present disclosure and may not constitute prior art.

Polymers have been widely used in oilfield industry for its superior properties. These polymers can be used as either linear or crosslinked. The polymers are built with monomers by covalently bonding in series. Most of the crosslinking are also covalently bonded. These polymer products when used in the formation, if not properly broken, will cause damage and impair production. In other applications, when the polymeric materials need to be removed, it is generally difficult due to the strong bonding. Viscoelastic surfactant (VES) fluid is self-assembled small surfactant molecules into giant worm-like micelles to give polymer like performance in fluid. When broken, there is no need to break the surfactant molecules, rather change the self assemble to alter the worm-like micelle structure to spherical micelles. This will lead to loss of the entanglements between worm-like micelle chains and in sequence loss of viscoelastic properties. The non-covalently bonded structure is beneficial to many oilfield applications. However, in order for the VES fluid to behave like a polymer solution, the concentration of the surfactant needs to be at higher level, at least an order of magnitude higher than that of polymers. Although surfactants can give some good features when it is in the formation, it can also be problematic in some other cases, such as forming emulsions with formation oil, alter the capillary behavior in the formation pores.

A new type of self-assembled structure based on hydrogen bonding is studied and disclosed in this application. The materials discussed in this application are mainly small molecules with molecular weight of a few hundreds. The molecules are full of functionalities that are capable of forming hydrogen bonding between each other. When the material is in melt state or in solution, hydrogen bonding makes the material behave like polymeric material to exhibit viscosity and elasticity. The hydrogen bonding can be destroyed by water dilution or elevated temperature, and they are also reversible, i.e. when cooled down or concentrated, the H-bonding reforms and the material behaves like polymer again.

SUMMARY

A method is disclosed comprising the steps of providing a supramolecular polymer fluid comprising units connected via reversible hydrogen bonds to form a supramolecular polymer; introducing the supramolecular polymer fluid in the well; and treating the well with the supramolecular polymer fluid.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the embodiments of the invention and should not be construed as a limitation to the scope and applicability of the invention. While the compositions of the invention are described herein as comprising certain materials, it should be understood that the composition could optionally comprise two or more chemically different materials. In addition, the composition can also comprise some components other than the ones already cited.

In this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

The application discloses the synthesis of the hydrogen bonding material. The behaviors of the H-bonding material at melt state and in concentrate solution state are also shown.

Rheology measurements of an aqueous solution at ~40% by weight are given. According to one aspect, this material is used as fluid loss additive.

Figure 1:
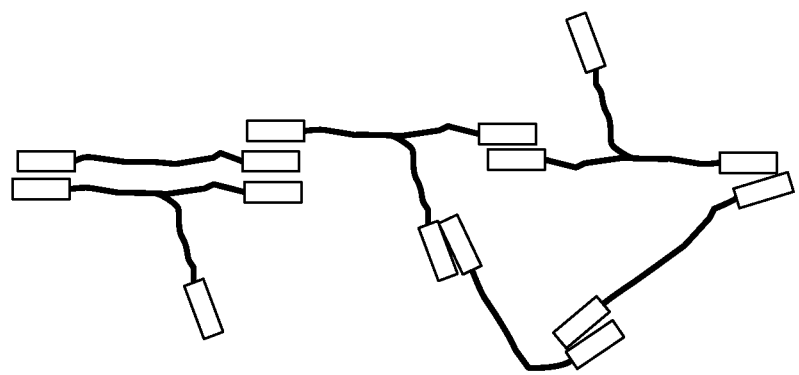
FIG. 1 shows an illustrative diagram of self-assembly of small molecules through hydrogen bonding giving polymeric material behavior.

FIG. 1 shows an illustrative diagram of self-assembly of small molecules through hydrogen bonding giving polymeric material behavior. The system uses designed molecules that have sites for hydrogen bonding. When the molecules are put together, these H-bonding site associate with each other and the small molecules actually forms a 3-D network based on the connections of the H-bonding at appropriate condition, and behaves like polymer. Once condition changes, such as solvent changes or temperature increases, the H-bonding breaks and the material behaves like a mixture of small molecules.

The following structure is an example of the starting materials used to make the final hydrogen bonding material:

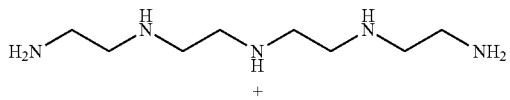
+

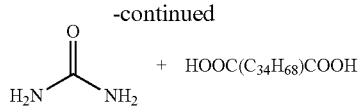

The materials and synthesis process are disclosed in U.S. Pat. Nos. 7,250,487 and 7,348,397. The main materials for the synthesis are oligo-ethylene diamine and urea. A small amount of acid dimer is added to adjust the crosslink degree and also act as plasticizer in order to tailor the final material properties, such as rubbery or plastic appearance. The oligo-ethylene diamines, with general formulation of $H(HNCH_2CH_2)_nNH_2$, that have been used in the synthesis include n=1 to 6, with focus on n=4 (TEPA). Acid used in the synthesis including dimer and monomer.

The synthesis is done in a one-pot reaction fashion. The starting materials were mixed in bulk and a beaker and heated up carefully with temperature ranging from 130 to 165° C. on a hot plate. Given the multiple functionalities and the hot reaction conditions, it is hard to define the reaction products, but here are just a few likely structures given below. The structures give a possible H-bonded structure among several of the adduct products of this one-pot reaction:

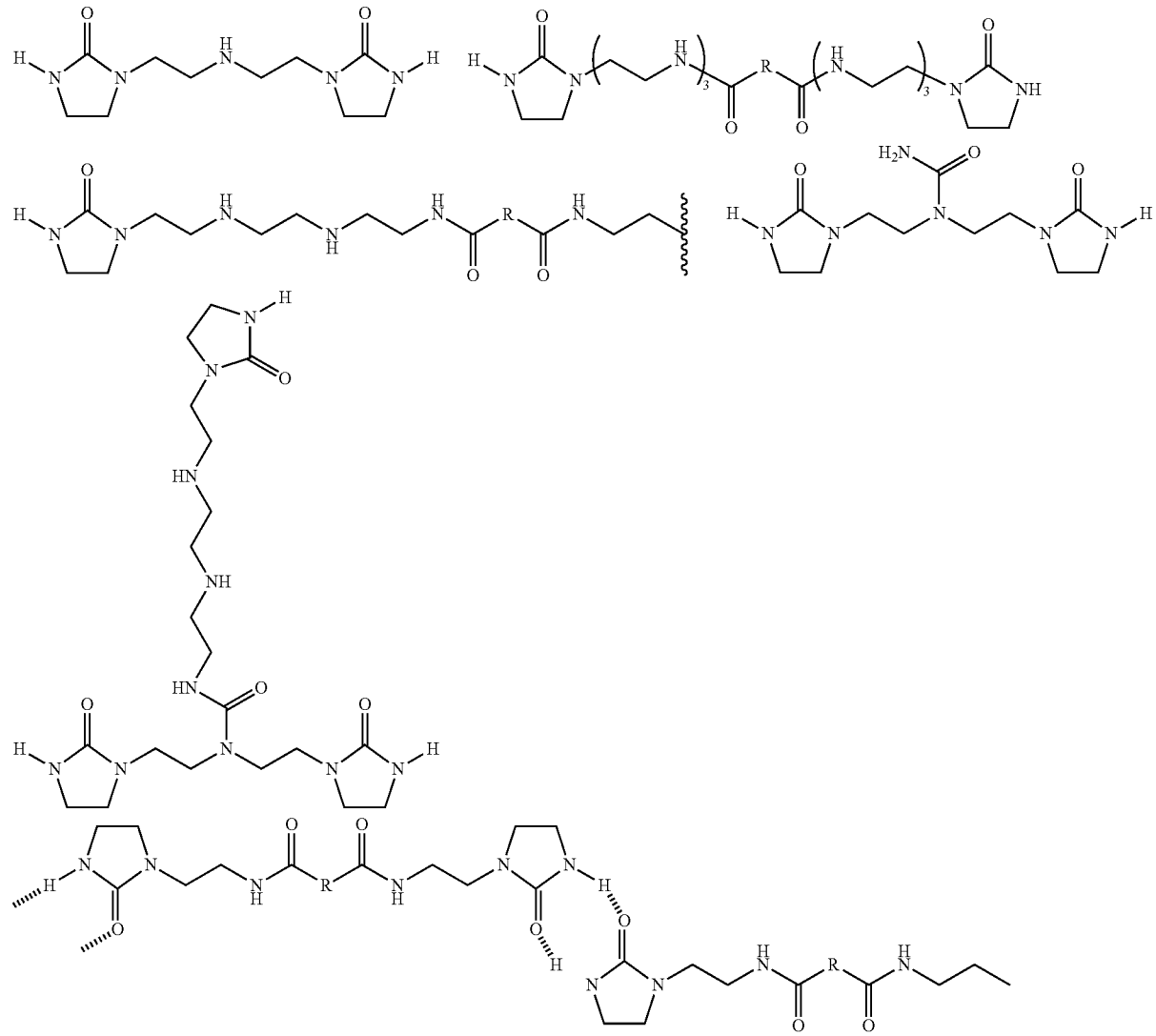

-continued

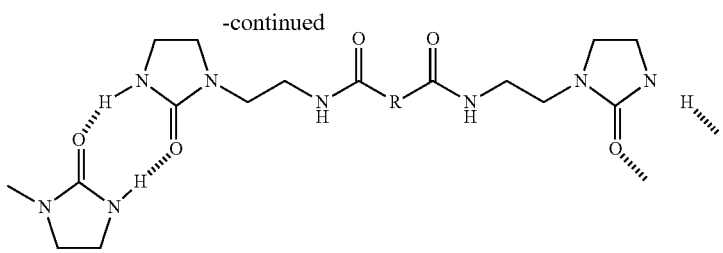

A few samples of this reaction formula and product are listed in Table 1. As shown in Table 1, the sample properties depend on the starting material and the ratios among them. For example, water solubility depends on the oligoamine selection. Samples made with diethylene triamine (sample 1) can be water swellable but not soluble, perhaps due to too small a molecule and too much crystallinity. Samples made with pentaethylene hexamine (sample 6 and 7) can not be fully dissolved in water. Samples made with tetraethlyene pentamine (sample 2-5) actually appear to have good solubility in water in the range of formulations attempted in this study. Water solubility is also a function of how much the dimer acid is included in the material. Sample made with more dimer acid (sample 6) is less soluble than the one made with less dimer acid (sample 7). This can be explained as that the dimer acid actually added hydrophobicity to the molecule by adding more hydrophobic units ($CH_2$) and also creating bigger molecule by linking two or more of the amine/urea adduct product. The product physical appearance also depends on the starting materials and their formulations.

Sample 1 made with diethylene triamine and dimer acid is hard glass like material probably due to the high crystallinity with the small molecule and less possible functionality. Sample 2 to 5 are all made with the same oligoamine, TEPA but with different amount of acid. No acid made the material look like a viscoelastic gel solid which easily slump to flat surface within short time, like a liquid. Adding acid, even the monomeric acid, improves the solid behavior of the product. The more the acid content, the more the solid like behavior (sample 3-5) is seen in the final product.

TABLE 1

| Sample ID | Urea | Amine $H(HNCH_2CH_2)_nNH_2$ | | Oleic acid | | Properties | |
|---|---|---|---|---|---|---|---|
| | | n | Amine function moles vs urea | type | Acid function moles vs urea | water soluble | appearance |
| 1 | 1 | 2 | 0.87 | Dimer | 0.21 | Swells but not dissolve | hard glass like solid |
| 2 | 1 | 4 | 0.84 | NA | 0.00 | yes | Thick flowable rubbery solid |
| 3 | 1 | 4 | 0.84 | Monomer | 0.06 | yes | Hygroscopic creeping solid. Stretch crystallize |
| 4 | 1 | 4 | 2.51 | Dimer | 0.21 | yes | Hard resin like solid, hygroscopic. Pull to form thin fiber at melt |
| 5 | 1 | 4 | 4.02 | Dimer | 0.34 | yes | Harder resin like solid, hygroscopic. Pull to form thin fiber at melt |
| 6 | 1 | 5 | 0.78 | Dimer | 0.21 | not fully dissolved | Hard resin like solid, hygroscopic. Pull to form thin fiber at melt |
| 7 | 1 | 5 | 0.78 | Dimer | 0.07 | better solubility than sample 6 | Hard resin like solid, hygroscopic. Pull to form thin fiber at melt |

Impressively, all of the materials in Table 1 show some polymeric material behavior. Some physical appearances of the one-pot reaction product at different states were tested: solid state looks like polymer resin, at elevated temperature like polymer melt and viscoelastic fluid in solution at room temperature.

Figure 2:
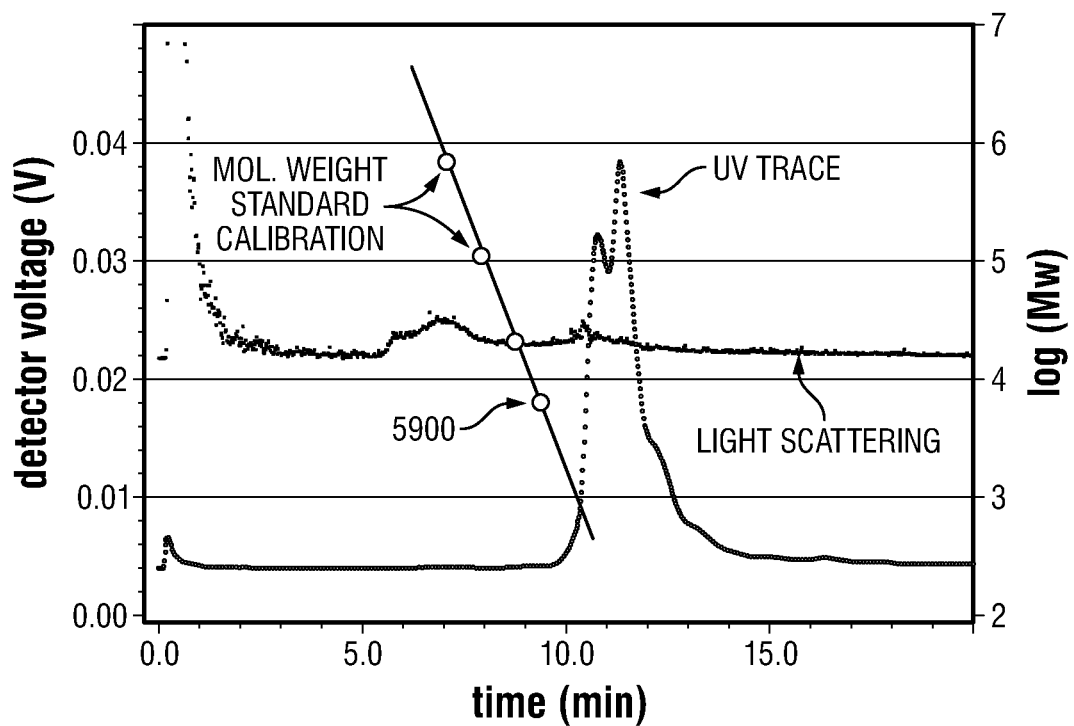
FIG. 2 shows molecular weight measurement of a synthetic product with gel permeation chromatography (GPC). The dots and their fitting line are for log(Mw), right y axis.

The synthetic materials from the one-pot reaction behave like polymer, so it is prudent to see if the material is in fact small molecules self-assembled or actually polymers. Attempts were made to measure the material molecular weight. Shown in FIG. 2 is a gel permeation chromatograph (GPC) measurement plot together with molecular weight calibration standard. The lowest molecular weight standard used in the calibration is 5,900 Dalton. The green trace, the UV detection, shows that the majority of the material synthesized is eluded out at above 10 minutes, which indicates that the molecular weights are less than 1000 Dalton. Light scatter also indicates that there are no significant large aggregates, which is in agreement with the dilute hydrogen bonding material solution. In shot, the products of this one-pot synthesis are not polymers, but molecules with molecular weights in a few hundreds, corresponding with the proposed structures above. For the material of such low molecular weight molecule to exhibit polymeric material behavior, combining with the hydrogen bonding functionalities in the molecules, it is believed that the materials must assembled via hydrogen bonding.

Figure 3:
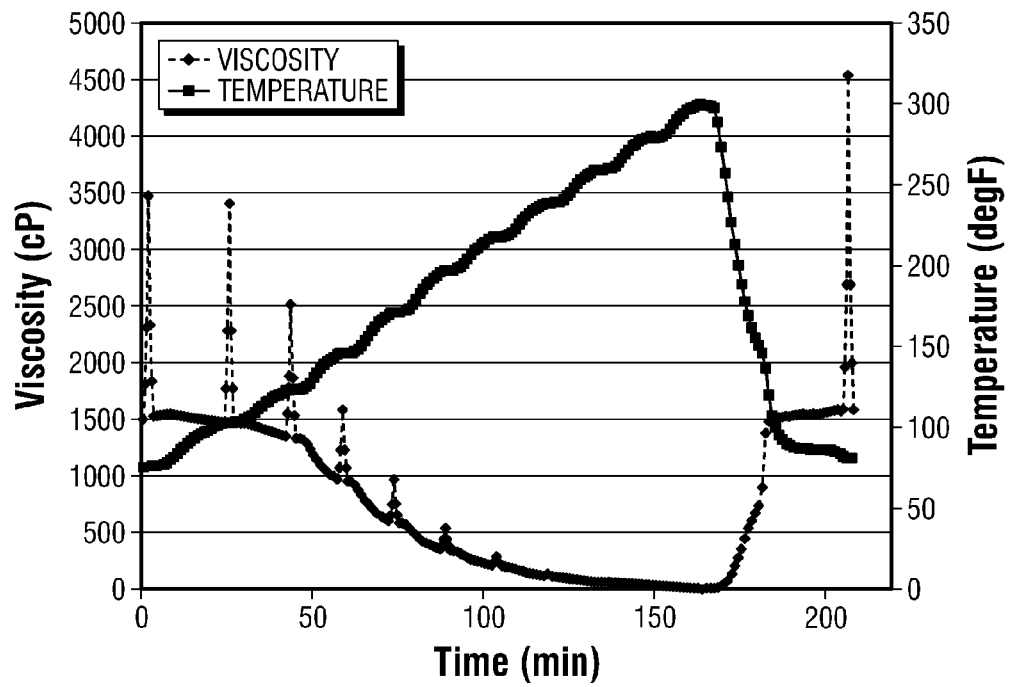
FIG. 3 shows viscosity vs. temperature of a 40 wt % sample of hydrogen bonding material in water.

The viscosities of a 40 wt % sample 5 vs. temperature were measured with a Fann50 type of viscometer using R1B5 geometry with a 100, 75, 50, 25, 50, 75 and 100/s shear ramps (where spikes shown in the viscosity trace) every 15 minutes during heating and with 100/s shear rate in between ramps. The results are plotted in FIG. 3. The fluid is viscoelastic at low temperature as indicated by the high low shear viscosity shown as big spikes during ramping, it gradually loses its viscosity and elasticity at elevated temperature, and becomes like a Newtonian fluid at about 220 degF. As the sample is cooled down to room temperature, the viscosity and elasticity of the sample completely recovers. This behavior is in agreement of a dynamic self-assembled structure. At lower temperature, the molecules in the aqueous solution is associated with hydrogen bonding, and shows rheology behavior like a high molecular weight polymer solution. When temperature increases, the hydrogen bonding weakens and the fluid starts to behave like a solution of small molecules. Once the fluid is cooled down, the hydrogen bonding reforms and the fluid is viscoelastic again. Even though the fluid has been sheared for over 3 hours and heated to 300 degF, there is no sign of it losing viscosity when cooled back down, again showing the system is a dynamic assembly. The hydrogen bonding is likely the force holding the self-assembly together.

Figure 4:
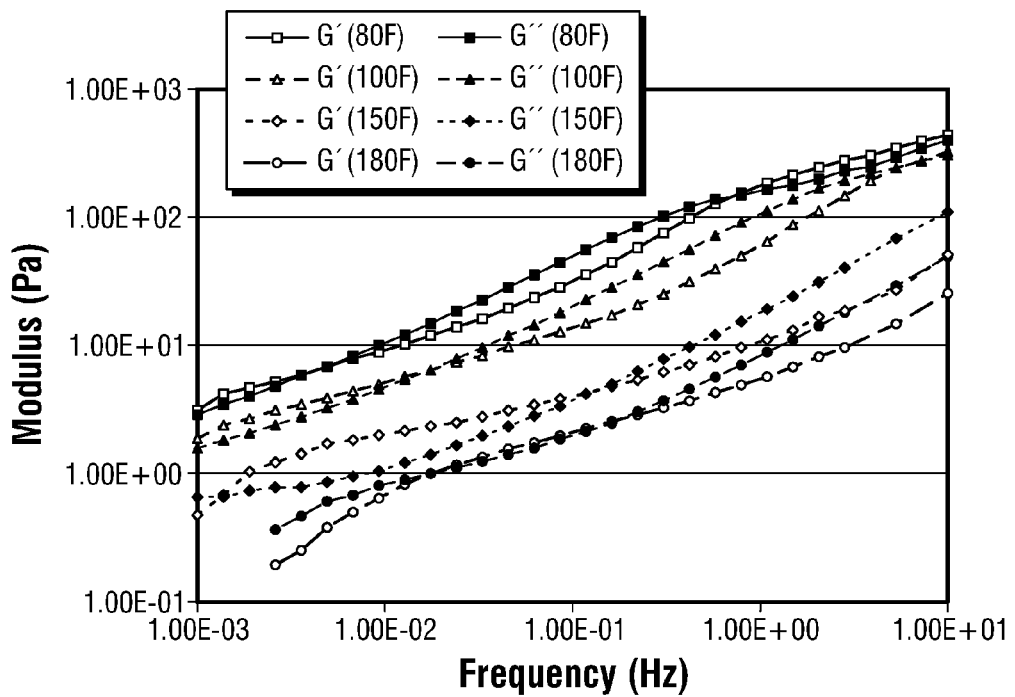
FIG. 4 shows dynamic rheology of a 40 wt % sample of hydrogen bonding material in water.

The dynamic rheological properties of the 40% by weight of sample 5 are also measured with a Bohlin rheometer at several temperatures. The results are plotted in FIG. 4. The rheological traces are quite interesting. In the measured frequency range, the elastic modulus G' and viscous modulus G" are close to each other, and in several temperatures, they seem to crossover twice. This double crossover is not commonly seen in this frequency range. It is not yet clear what this means in terms of fluid property but is certainly worth more explorations.

The hydrogen bonding material fluids may be used, for example in oilfield treatments. The fluids may also be used in other industries, such as in household and industrial cleaners, agricultural chemicals, personal hygiene products, cosmetics, pharmaceuticals, printing and in other fields.

The hydrogen bonding material systems may be used for carrying out a variety of subterranean treatments, including, but not limited to, drilling operations, fracturing treatments, and completion operations (e.g., gravel packing). In some embodiments, the hydrogen bonding material systems may be used in treating a portion of a subterranean formation. In certain embodiments, the hydrogen bonding material systems may be introduced into a well bore that penetrates the subterranean formation. Optionally, the hydrogen bonding material systems further may comprise particulates and other additives suitable for treating the subterranean formation. For example, the hydrogen bonding material systems may be allowed to contact the subterranean formation for a period of time sufficient to reduce the viscosity of the treatment fluid. In some embodiments, the hydrogen bonding material systems may be allowed to contact hydrocarbons, formations fluids, and/or subsequently injected treatment fluids, thereby reducing the viscosity of the treatment fluid. After a chosen time, the hydrogen bonding material systems may be recovered through the well bore.

In certain embodiments, the hydrogen bonding material systems may be used in fracturing treatments. In the fracturing embodiments, the hydrogen bonding material may be introduced into a well bore that penetrates a subterranean formation at or above a pressure sufficient to create or enhance one or more fractures in a portion of the subterranean formation. Generally, in the fracturing embodiments, the hydrogen bonding material systems may exhibit gel behavior. Optionally, the hydrogen bonding material systems further may comprise particulates and other additives suitable for the fracturing treatment. After a chosen time, the hydrogen bonding material systems may be recovered through the well bore.

There are many other possible applications for material with hydrogen bonding associations.

In one aspect, the hydrogen bonding material can be used as a gel packer material. As demonstrated in Table 1, the material properties can be adjusted with the synthesis formulations, it is possible to make a product that behaves like an elastomer. The material can be set and remove by altering the solvent quality, temperature etc. activate or deactivate the hydrogen bonding and therefore turn on and off the material property. This on and off switch can be used multiple times as there may be no damage to the molecular covalent bonds.

In another aspect, the hydrogen bonding material may be a gelling agent. As already discussed in the previous sections, the solution of this fluid can behave like polymer solution and therefore can potentially carry out the polymer gel functions. The dynamic assembly property of the hydrogen bonding material allows also no shear degradation, easy breaking by changing solvent quality or other environment properties, such as pH. The broken material is small molecules which can be removed easier than polymer material.

Still in another aspect, the hydrogen bonding material may be a crosslinker or crosslinker aid. The dynamic assembly nature of crosslinking is of advantage in many cases. For example, during pumping applications, high shear is imposed on the fluid. If a fluid is crosslinked by covalent bond, shear degradation can easily happen where the fluid viscosity is permanently lost. If crosslink is achieved via hydrogen bonding, the problem can be overcome.

Still in another aspect, the hydrogen bonding material may be a permeability modifier or fluid loss additive. When high permeable zones are encountered, unexpected fluid loss happens and can jeopardize the intended applications. Providing a fluid loss control is necessary in this situation to block off the high permeability. One the other hand, the high perm zones are often the zone of interests and it is desired to recover the permeability. In this case, a material that can temporarily block the permeability and cleanup later is of interests. In some cases, water is in certain zones and a material that can respond to the water would be useful. A tests setup and result will be discussed in more detail below.

A prominent feature of this hydrogen bonding material is that it is hygroscopic, which absorbs water readily and forms a thick gel. This can be used to block off water when it encounters.

Figure 5:
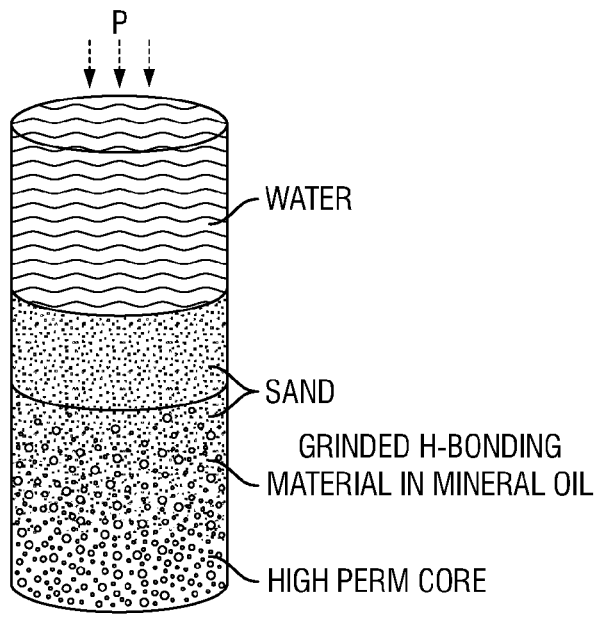
FIG. 5 shows modified fluid loss setup diagram for testing hydrogen bonding material.
Figure 6:
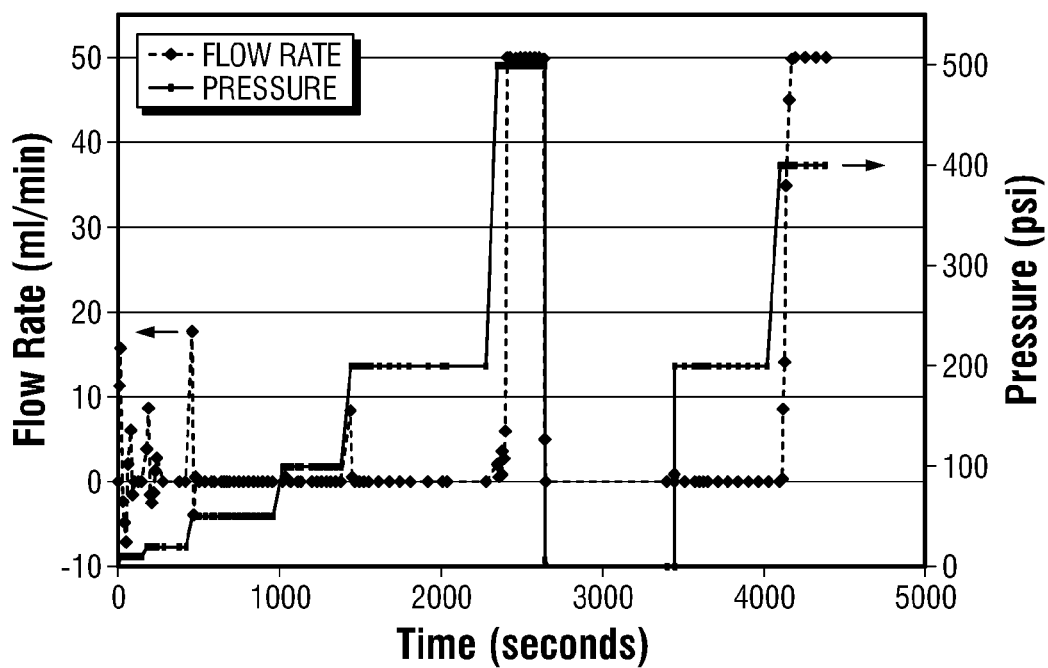
FIG. 6 shows fluid loss plot of hydrogen bonding material on a 1000 mD core.

A modified fluid loss setup is shown in FIG. 5 to demonstrate this application. As shown in FIG. 5, a high permeability core is put at the bottom of the fluid loss setup, some grinded hydrogen bonding material in mineral oil is added to the core holder. Some sand is added on top of the material. Water (with 2% KCl) is filled into the head space of the cell. Pressure was applied with either an ISCO pump or house nitrogen, with no back pressure. All tests were performed at room temperature. Plotted in FIG. 6 is one of the fluid loss test results. The core used in this study has a high permeability to 2% KCl of 1000 mD. The test was started by applying a 10 psi pressure with ISCO pump. The flow rate out of ISCO pump as indicated by the ISCO pump is recorded with short time intervals. As one can see from the plot in FIG. 6, at the beginning when the pressure is applied, there is a surge of flow to the system, and then it slows down with a little oscillation and then stopped. Since the hydrogen bonding material is loaded in mineral oil, the initial fluid loss is due to the fluid loss of this mineral oil. The flow then slowed down and eventually stopped. This behavior is an indication of that the material had absorbed water, swelled and becomes a gel to block the water flow. After a short while of no flow through the core, the pressure was raised to 20 psi, the material again stopped the flow in seconds. The test was repeated with pressure increases several times, until pressure reaches 500 psi, the hydrogen bonding material attempted to stop the flow as indicated by the flow rate fluctuation, but eventually could not hold it and the fluid broke through, as indicated by the 50 mL/min flow rate. The maximum flow rate is restricted to 50 mL/min through the ISCO pump. The material can not hold 500 psi differential pressure. The pressure now was reduced to 1 psi and the test setup was allowed to sit for 13 minutes and pressure was reapplied. The pressure was first raised to 200 psi and it was found that the system withstood this situation, showing that the material can have some self-healing ability. The pressure was then increased to 500 psi again, and breakthrough happened again. 500 psi is the maximum differential pressure this material can stand at this permeability core. Another interesting observation is that when the core is measured for regained permeability in the opposite direction of the fluid loss, the permeability is completely regained. This observation validated the non-damaging small molecule nature of the hydrogen bonding material.

Figure 7:
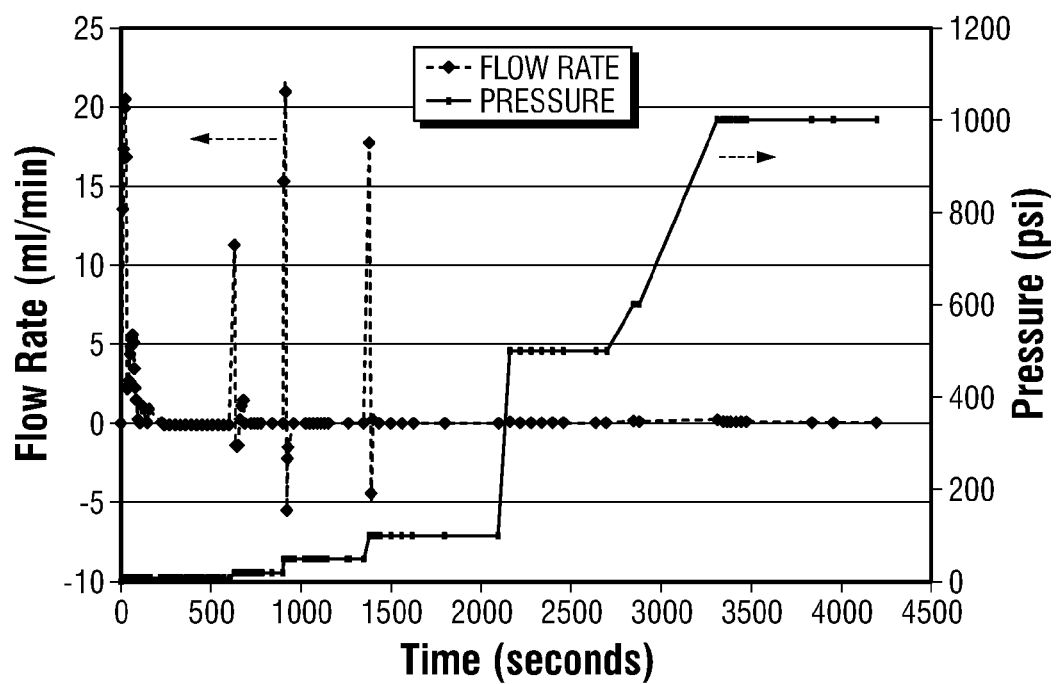
FIG. 7 shows fluid loss plot of hydrogen bonding material on a 238 mD core.

A similar test was run with a 238 mD core and the results are shown in FIG. 7. Under this condition, the flow was completely stopped even when the differential pressure was increased to 1000 psi. The pressure was further increased to 1500 psi with house nitrogen and still no break-through was observed.

Similar situation of using water to swell the hydrogen bonding material can also be used to temporarily stop water flood into a production zone. This material can be pre-placed into the formation which will be swollen to gel to block water when water presence.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method comprising:
providing a supramolecular polymer fluid comprising units connected via reversible hydrogen bonds to form a supramolecular polymer, wherein the supramolecular polymer has a molecular weight less than 1,000 Daltons;
introducing the supramolecular polymer fluid in a well; and
treating the well with the supramolecular polymer fluid.

2. The method of claim 1, wherein the supramolecular polymer fluid exhibits elastomeric properties during treatment.

3. The method of claim 2, wherein the supramolecular polymer fluid becomes a packer.

4. The method of claim 1, wherein the supramolecular polymer fluid exhibits gelling properties.

5. The method of claim 4, wherein the supramolecular polymer fluid is a fracturing fluid.

6. The method according to claim 1, wherein the supramolecular polymer fluid is a crosslinking agent.

7. The method according to claim 1, wherein the supramolecular polymer fluid is a permeability modifier.

8. The method according to claim 1, wherein the supramolecular polymer fluid is a fluid loss agent.

9. The method according to claim 1, wherein the supramolecular polymer fluid absorbs water.

10. A method of treating a well, comprising:
providing a supramolecular polymer fluid comprising units connected via reversible hydrogen bonds to form a supramolecular polymer, wherein the supramolecular polymer has a molecular weight less than 1,000 Daltons;
introducing the supramolecular polymer fluid in the well; and
controlling fluid loss in the well with the supramolecular polymer fluid.

11. The method of claim 10, wherein the supramolecular polymer absorbs water.

12. A method of treating a well, comprising:
providing a supramolecular polymer fluid comprising units connected via reversible hydrogen bonds to form a supramolecular polymer, wherein the supramolecular polymer has a molecular weight less than 1,000 Daltons;
introducing the supramolecular polymer fluid in the well; and
treating the well with the supramolecular polymer fluid.

13. The method of claim 12, wherein the supramolecular polymer fluid exhibits elastomeric properties during treatment.

14. The method of claim 13, wherein the supramolecular polymer fluid becomes a packer.

15. The method of claim 12, wherein the supramolecular polymer fluid exhibits gelling properties.

16. The method of claim 15, wherein the supramolecular polymer fluid is a fracturing fluid.

17. The method according to claim 12, wherein the supramolecular polymer fluid is a crosslinking agent.

18. The method according to claim 12, wherein the supramolecular polymer fluid is a permeability modifier.

* * * * *